(12) United States Patent
Kemmerer et al.

(10) Patent No.: US 10,123,484 B2
(45) Date of Patent: Nov. 13, 2018

(54) ADJUSTABLE VANES FOR USE IN A CYLINDRICAL ROTOR CAGE OF AN AGRICULTURAL HARVESTER

(71) Applicant: CNH Industrial America LLC, New Holland, PA (US)

(72) Inventors: Benjamin Kemmerer, New Holland, PA (US); Wayne T. Flickinger, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/155,380

(22) Filed: May 16, 2016

(65) Prior Publication Data

US 2017/0325407 A1    Nov. 16, 2017

(51) Int. Cl.
| | | |
|---|---|---|
| *A01F 7/06* | (2006.01) | |
| *B02B 3/06* | (2006.01) | |
| *A01F 12/18* | (2006.01) | |
| *A01F 12/24* | (2006.01) | |
| *A01F 12/44* | (2006.01) | |
| *A01F 12/46* | (2006.01) | |

(52) U.S. Cl.
CPC ............ *A01F 12/181* (2013.01); *A01F 7/062* (2013.01); *A01F 12/24* (2013.01); *A01F 12/446* (2013.01); *A01F 12/46* (2013.01)

(58) Field of Classification Search
CPC .......... A01F 7/067; A01F 12/18; A01F 12/24; A01F 7/06; A01D 41/00
USPC .......................................... 460/108, 109, 69
See application file for complete search history.

(56) References Cited

U.S. PATENT DOCUMENTS

| | | | | |
|---|---|---|---|---|
| 4,244,380 | A * | 1/1981 | DePauw | A01F 7/067 460/108 |
| 4,258,726 | A * | 3/1981 | Glaser | A01F 12/24 460/109 |
| 7,473,170 | B2 | 1/2009 | McKee et al. | |
| 8,540,559 | B1 | 9/2013 | Flickinger et al. | |
| 2008/0207287 | A1* | 8/2008 | McKee | A01F 7/067 460/69 |
| 2009/0111547 | A1* | 4/2009 | Pope | A01F 7/067 460/80 |
| 2011/0320087 | A1 | 12/2011 | Farley et al. | |
| 2013/0178255 | A1* | 7/2013 | Farley | A01F 7/067 460/70 |
| 2015/0141097 | A1* | 5/2015 | Regier | A01F 12/28 460/80 |
| 2016/0000009 | A1 | 1/2016 | DuQuesne et al. | |

FOREIGN PATENT DOCUMENTS

WO    2014117450 A1    8/2014

OTHER PUBLICATIONS

European Search Report for European Application No. 17171202.9 dated Aug. 22, 2017 (6 pages).

* cited by examiner

*Primary Examiner* — Arpad Fabian-Kovacs
(74) *Attorney, Agent, or Firm* — Patrick M. Sheldrake

(57) ABSTRACT

An adjustable vane system for use with a rotor cage of a threshing system of an agricultural harvester. The vane system includes a vane having a generally helically curved inner profile; a surface being an outer profile that is opposite the inner profile and is generally helically curved over a portion of the vane; a first flat portion proximate an end of the vane on the outer profile; and a second flat portion proximate to another end of the vane on the outer profile.

18 Claims, 6 Drawing Sheets

ADJUSTABLE VANES FOR USE IN A CYLINDRICAL ROTOR CAGE OF AN AGRICULTURAL HARVESTER

BACKGROUND OF THE INVENTION

1. Field of the Invention

The present invention relates to agricultural harvesters such as combines, and, more particularly, to adjustable vane systems used with a threshing rotor in a crop processing section of the combine.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. The threshing rotor is provided with rasp bars that interact with the crop matter in order to further separate the grain from the crop matter, and to provide positive crop movement.

Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more threshing rotors which can extend axially (front to rear) or transversely within the body of the combine, and which are partially or fully surrounded by a perforated concave. Again, the one or more threshing rotors are provided with rasp bars that interact with the crop matter to separate grain and to provide positive crop movement. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger. The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

Variable pitch vanes within the rotor cage can bind as the vanes are moved causing them to be less effective than is desired. The binding is generally caused by trapped crop material that wedges beneath the vanes.

Accordingly, what is needed in the art is a way to control the pitch of the vanes in a manner that has a non-binding or reduced binding characteristic and is cost effective.

SUMMARY OF THE INVENTION

The present invention provides a pivoting adjustable vane system in the threshing system of an agricultural harvester.

In one form, the invention is directed to an adjustable vane system for use with a rotor cage of a threshing system of an agricultural harvester. The vane system includes a vane having a generally helically curved inner profile; a surface being an outer profile that is opposite the inner profile and is generally helically curved over a portion of the vane; a first flat portion proximate an end of the vane on the outer profile; and a second flat portion proximate to another end of the vane on the outer profile.

In another form, the invention is directed to a threshing system for use in an agricultural harvester. The threshing system includes a rotor cage with a plurality of slots therein, the rotor cage having a generally cylindrical inner surface; and a plurality of adjustable vanes pivotally coupled to the rotor cage. Each vane has a generally helically curved inner profile; a surface being an outer profile that is opposite the inner profile and is generally helically curved over a portion of the vane; a first flat portion proximate an end of the vane on the outer profile; and a second flat portion proximate to another end of the vane on the outer profile.

An advantage of the present invention is that the vanes are spaced and provide for some movement in a radially in and out direction relative to the rotor cage.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
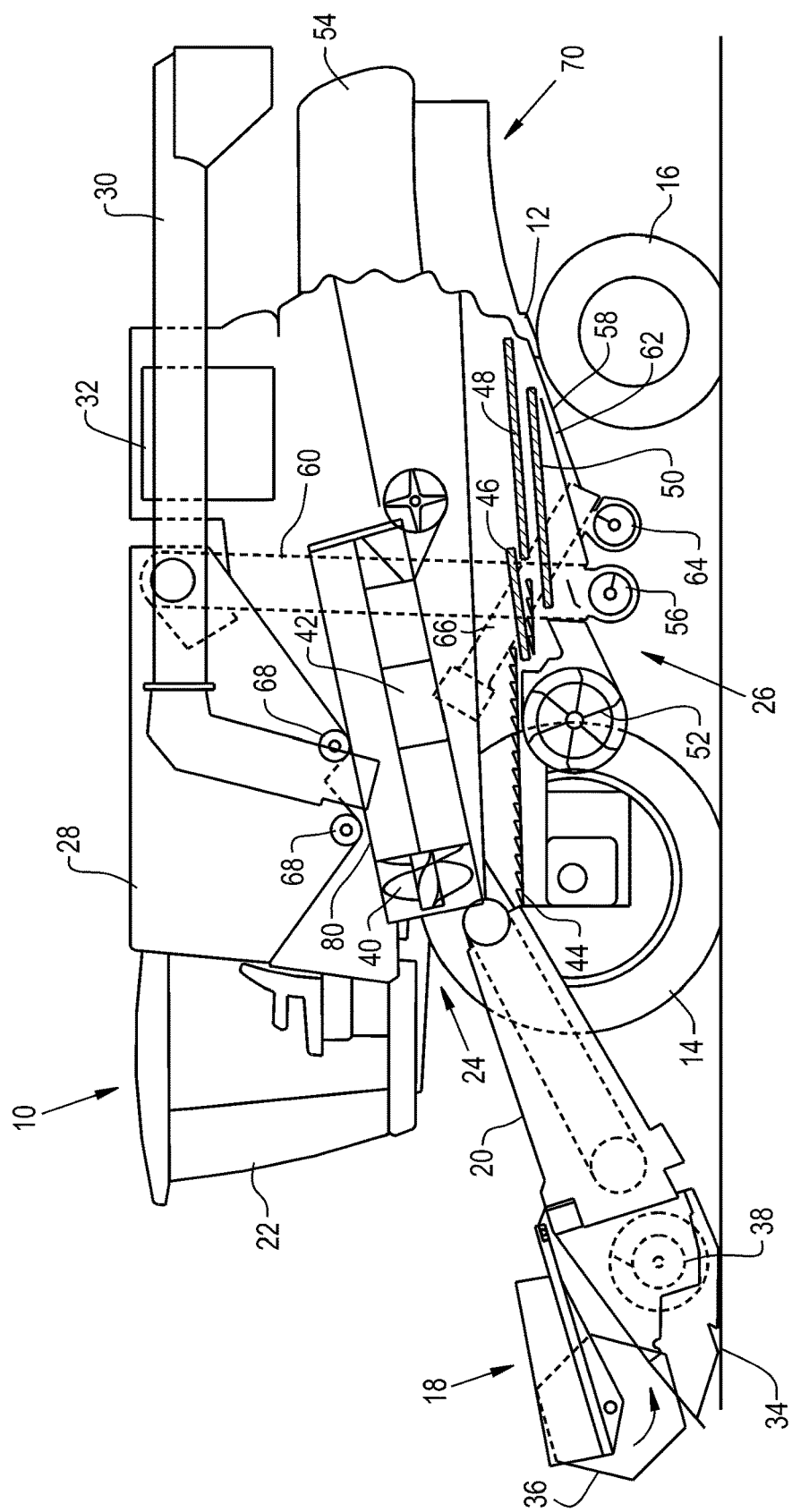
FIG. 1 is a side view of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading conveyance 30. Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a threshing rotor 40 at least partially enclosed by a rotor cage and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve or sieve assembly), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of the residue handling system 70 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
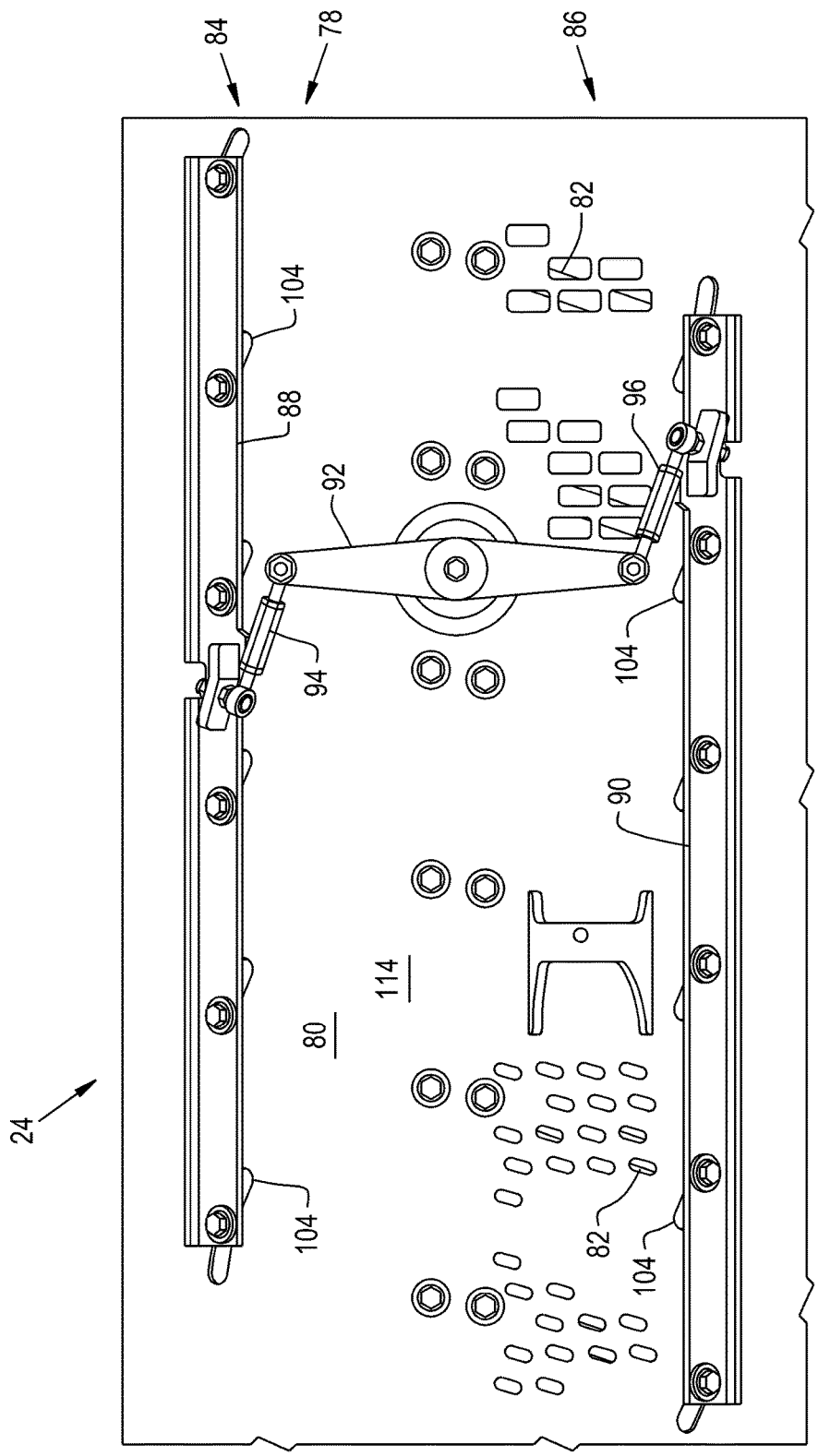
FIG. 2 is a plan view of the curved side of a rotor cage of a threshing system having an embodiment of a vane adjustment system of the present invention used in the combine of FIG. 1.
Figure 3:
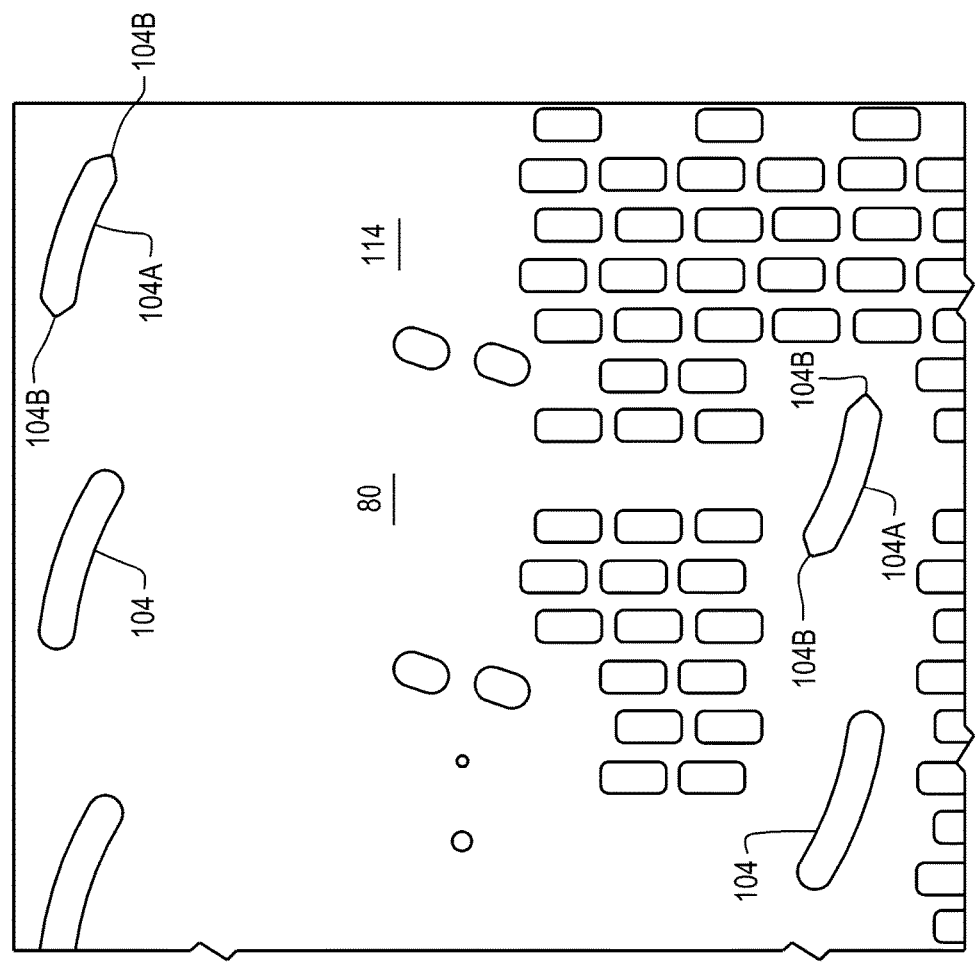
FIG. 3 is a plan view of the rotor cage of FIG. 2 with the adjustment system removed.
Figure 4:
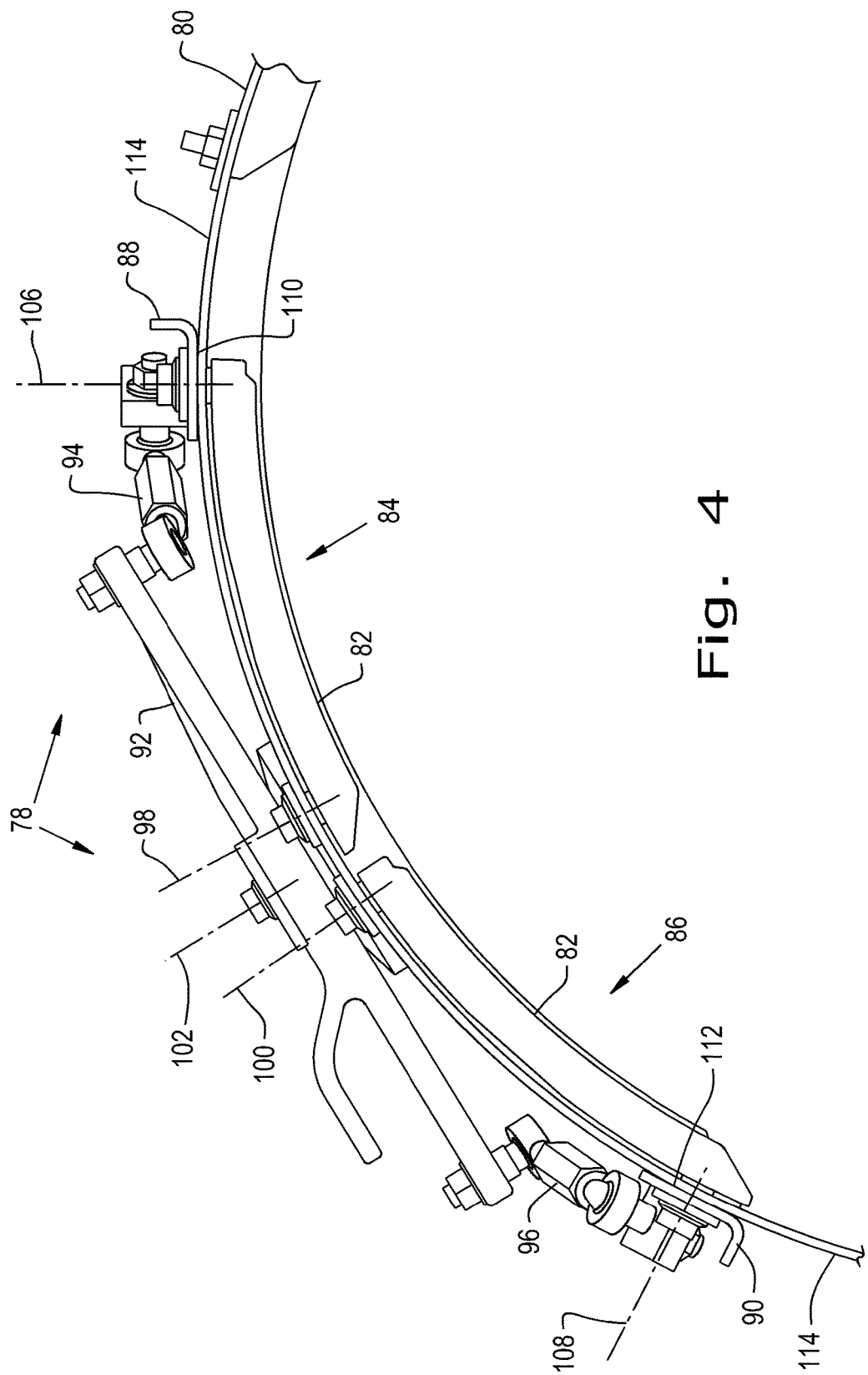
FIG. 4 is a sectioned end vies of the rotor cage of FIGS. 2 and 3 with the vane adjustment system seen in profile.

Now, additionally referring to FIGS. 2-4 there is shown a partial view of threshing system 24, more particularly showing vane adjustment system 78 coupled to a rotor cage 80 with vanes 82 positioned along an inner surface of cage 80 in banks 84 and 86 of vanes 82. A sliding member 88 is pivotally coupled to one end of vanes 82 of bank 84, and sliding member 90 is pivotally coupled to an end of vanes 82 of bank 86. An arm 92 is pivotally coupled to cage 80 and is coupled to member 88 by way of a linkage 94 and to member 90 by way of a linkage 96.

Vanes 82 of bank 84 are pivotally attached about axes 98 to rotor cage 80 and vanes 82 of bank 86 are pivotally coupled to rotor cage 80 about axes 100. Arm 92 is pivotally coupled to rotor cage 80 about an axis 102. Vanes 82 of bank 84 are pivotally coupled to sliding member 88 though slots 104 about an axes 106, which are arcuately shaped to correspond to a pivotal range of travel of vanes 82. In a like manner, vanes 82 of bank 86 are pivotally coupled to sliding member 90 though slots 104 about axes 108, which are arcuately shaped to correspond to a pivotal range of travel of vanes 82 of bank 86.

Members 88 and 90 each have a respective inner surface 110 and 112 that remains tangent to an outer surface 114 of rotor cage 80 over the entire range of movement of members 88 and 90. As arm 92 is pivoted the pivotal movement of vanes 82 takes place in a coordinated manner with force being transmitted from arm 92 to members 88 and 90 respectively by linkages 94 and 96. The full range of movement of vanes 82 is subject to slots 104A, which are a modified version of slots 104. Slots 104 are generally oversize to allow space so that if any crop material gets into the slots 104 that the full range of motion of vane adjustment system 78 can still take place. However, slots 104A are slightly shortened and have a reduced throat 104B feature that serves as a hard stop for the motion of adjustment system 78.

Axes 98, 100, 102, 106 and 108 are all substantially normal to surface 114. Even axes 106 and 108 which move along the curved outer surface 114, due to the shape and location of slots 104, remain normal to surface 114 over their range of movement.

Figure 5:
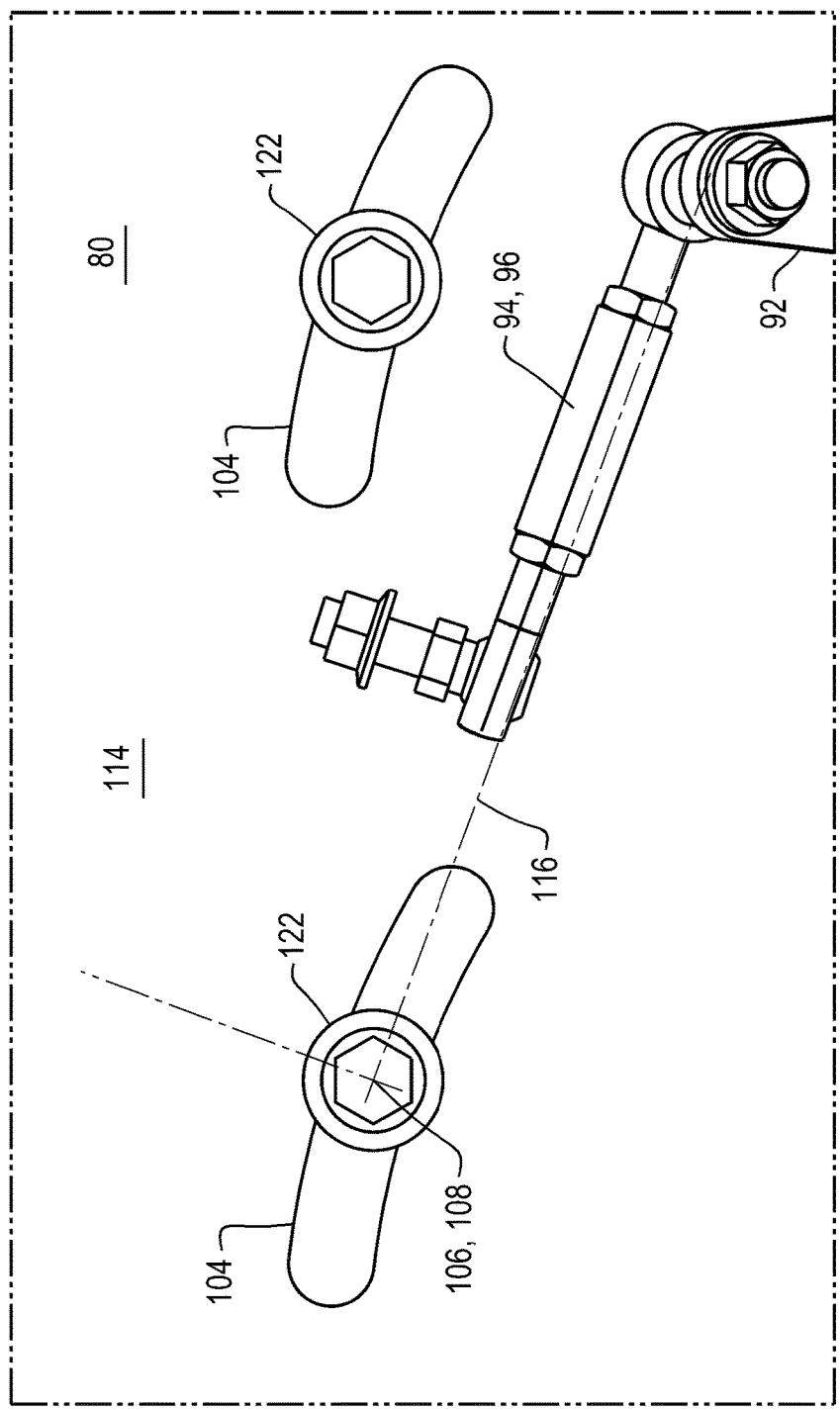
FIG. 5 is a view of part of the vane adjustment system of FIGS. 2 and 4 with some elements removed to illustrate some geometric relationships of elements of the vane adjustment system.

Now, additionally referring to FIG. 5 there is shown some further details about adjustment system 78. Here member 88 or 90 is omitted for the sake of clarity with linkage 94 or 96 shown connected to arm 92 and oriented as if linkage 94/96 were coupled to member 88/90. Linkage 94/96 has a longitudinal axis 116 that is parallel with a tangent of the movement of the point represented by axis 106 or 108, which is the pivot point between member 88/90 and vanes 82. Here this relationship is illustrated with longitudinal axis 116 intersecting an axis 106 at the midpoint of travel of axis 106/108 within slot 104.

Figure 6:
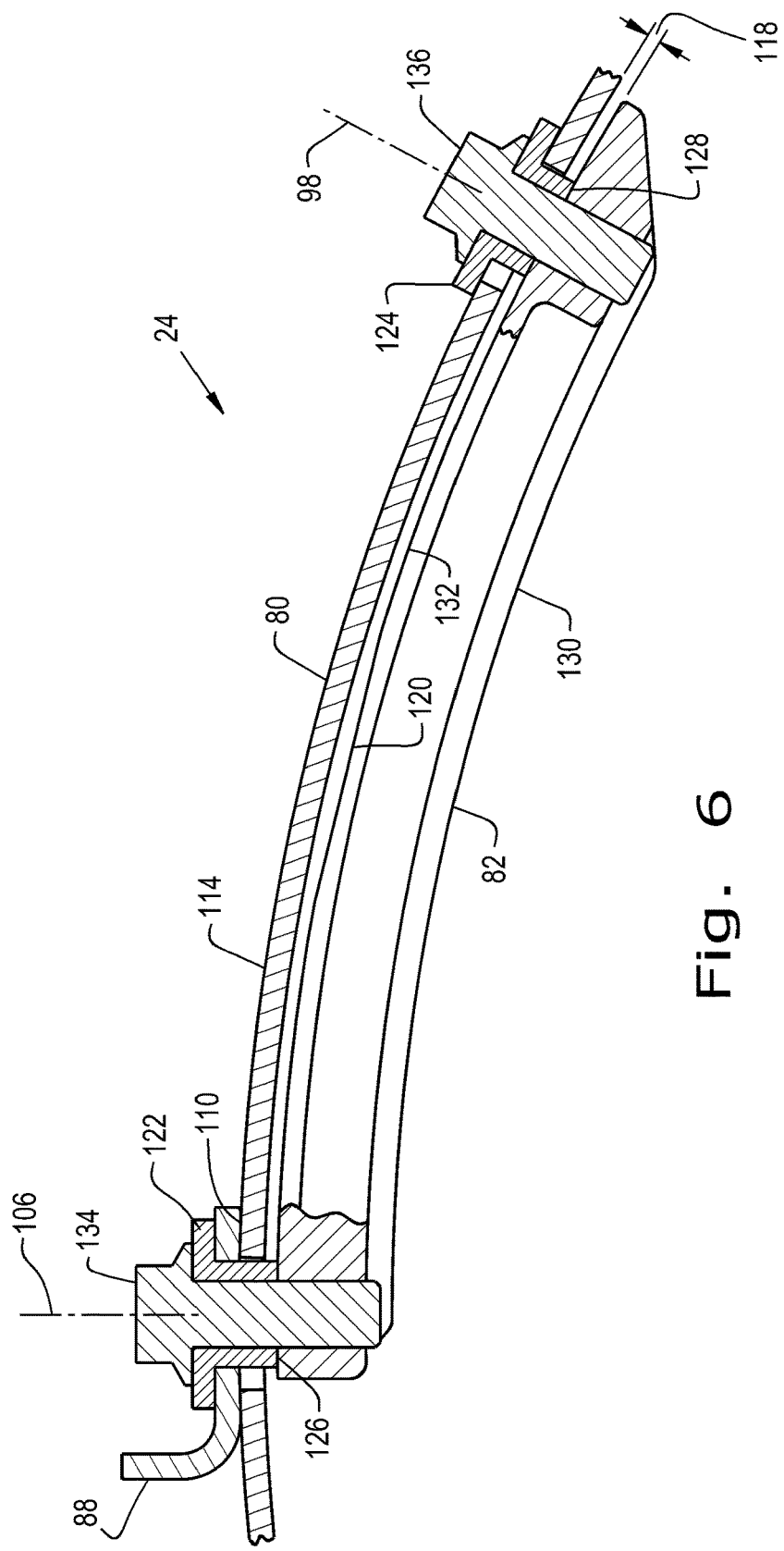
FIG. 6 is a view of an embodiment of one of the vanes of the present invention coupled to the vane adjustment system.

Now, additionally referring to FIG. 6, there is shown a closer view of one of vanes 82 with a cross-sectional view of cage 80 where vane 82 is shown spaced a distance 118 from cage 80 when crop material is not pressing against vane 82. Vane 82 has a flat portion 120 midway between axis 98 and axis 106. Vane 82 can move distance 118 due to the spacing allowed by shoulder bushings 122 and 124. Although, the movement of vane 82 is shown as influenced by gravity, it is also contemplated that a biasing feature could be used. The free movement of vane 82 in an axial direction in and out relative to cage 80 allows for crop material to disengage from between vane 82 and cage 80. Distance 118 is a predefined distance such as approximately 4 mm or the predefined distance can be approximately 4 mm or less.

The flat portion 120 of vane 82 is there to compensate for the change in curvature geometry between cage 80 and vanes 82, as vanes 82 are pivoted about axes 98 and 100. Flat portion 120 allows a needed clearance when members 88 and 90 are slid.

The present invention advantageously provides rotor cage 80 slot 104 geometry that constrains vanes 82 to defined pivotal path. Slots 104 provide a greater range of movement than necessary to ensure that crop material build up never limits the full range of motion. Slots 104A, which are one of the slots 104 in each bank 84 and 86 is notched at 104B to provide a hard stop at either end of the desired range of motion. Adjustment arm 92 rotates or pivots about axis 102 providing an equal and opposite motion to vane banks 84 and 86. Axis 102 is perpendicular to rotor cage 80. The adjustment of vane banks 84 and 86 occurs on two separate planes which are moved along cage 80 by way of spherical rod ends on linkages 94 and 96. Positioning of linkages 94 and 96 from arm 92 to vane rails 88 and 90 is such that they are parallel to the motion of axes 106 and 108 in slots 104 at a center of slots 104 to thereby generate an optimal use of the force available to adjust vanes 82. An actuating system to move arm 92 has been purposely omitted for the sake of clarity in the presentation of the present invention.

Each vane 82 also has flat areas 126 and 128 to respectively accommodate bushings 122 and 124. Flat portions 126 and 128 are of similar size and each are smaller than flat portion 120. The curved inner profile 130 is referred to as the inner profile 130 because it is closer to the rotor 40. An outer surface 132 of vane 82 is generally curved with flat areas 120, 126 and 128 interrupting the curved surface. The curved surfaces of vane 82 are helically curved and may match inner cylindrical curvature of rotor cage 80 at the midpoint of the positioning of vane 82 in its range of movement. As vane 82 departs from the midpoint flat area 120, in particular allows for easier, non-binding movement of vane 82 as adjusting system 78 pivots vanes 82. Also the sizing of bushings 122 and 124 allow for a radially inward and outward movement of vane 82 during operation of combine 10. Bolts 134 and 136 can be considered coupling devices 134 and 136 that extend through bushings 122 and 124 to couple vanes 82 of the vane system to a pivot point at axis 98 and a member 88 at axis 106, for example.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An adjustable vane system for use with a rotor cage of a threshing system of an agricultural harvester, the vane system comprising:
   a vane having:
   a generally helically curved inner profile;
   a surface being an outer profile that is opposite the inner profile and is generally helically curved over a portion of the vane, the outer profile being positioned closer to the rotor cage than the inner profile;
   a first flat portion proximate an end of the vane on the outer profile;
   a second flat portion proximate to an other end of the vane on the outer profile; and
   further comprising a third flat portion located midway along the outer profile.

2. The adjustable vane system of claim 1, wherein the third flat portion is larger than the first flat portion and the second flat portion.

3. The adjustable vane system of claim 1, wherein the first flat portion and the second flat portion are of a similar size.

4. The adjustable vane system of claim 1, further comprising:
   a first coupling device connected to the vane at the first flat portion; and
   a second coupling device connected to the vane at the second flat portion.

5. The adjustable vane system of claim 4, further comprising:
   a first bushing extending through the rotor cage and in contact with the first flat surface; and
   a second bushing extending through the rotor cage and in contact with the second flat surface.

6. The adjustable vane system of claim 5, wherein the first bushing and the second bushing have different lengths.

7. The adjustable vane system of claim 5, wherein the coupling devices extend through the bushings.

8. The adjustable vane system of claim 6, wherein the lengths of the bushings allow movement of the vane up to a predefined distance from the rotor cage.

9. The adjustable vane system of claim 8, wherein the predefined distance is approximately 4 mm or less.

10. A threshing system for use in an agricultural harvester, the threshing system comprising:
    a rotor cage with a plurality of slots therein, the rotor cage having a generally cylindrical inner surface; and a plurality of adjustable vanes pivotally coupled to the rotor cage, each vane having: a generally helically curved inner profile;

a surface being an outer profile that is opposite the inner profile and is generally helically curved over a portion of the vane, the outer profile being positioned closer to the rotor cage than the inner profile;

a first flat portion proximate an end of the vane on the outer profile;

a second flat portion proximate to an other end of the vane on the outer profile; and wherein each vane further comprises a third flat portion located midway along the outer profile.

11. The threshing system of claim 10, wherein the third flat portion is larger than the first flat portion and the second flat portion.

12. The threshing system of claim 10, wherein the first flat portion and the second flat portion are of a similar size.

13. The threshing system of claim 10, wherein each vane has:

a first coupling device connected to each vane at the first flat portion; and a second coupling device connected to each vane at the second flat portion.

14. The threshing system of claim 13, wherein each vane has:

a first bushing extending through the rotor cage and the first bushing is in contact with the first flat surface; and a second bushing extending through the rotor cage and the second bushing is in contact with the second flat surface.

15. The threshing system of claim 14, wherein the first bushing and the second bushing have different lengths.

16. The threshing system of claim 14, wherein the coupling devices extend through the bushings.

17. The threshing system of claim 15, wherein the lengths of the bushings allow movement of the vane up to a predefined distance from the rotor cage.

18. The threshing system of claim 17, wherein the predefined distance is approximately 4 mm or less.

* * * * *